Dec. 27, 1955  A. E. EBNETER  2,728,540
BALLOON SUSPENSION SYSTEM
Filed Jan. 29, 1954
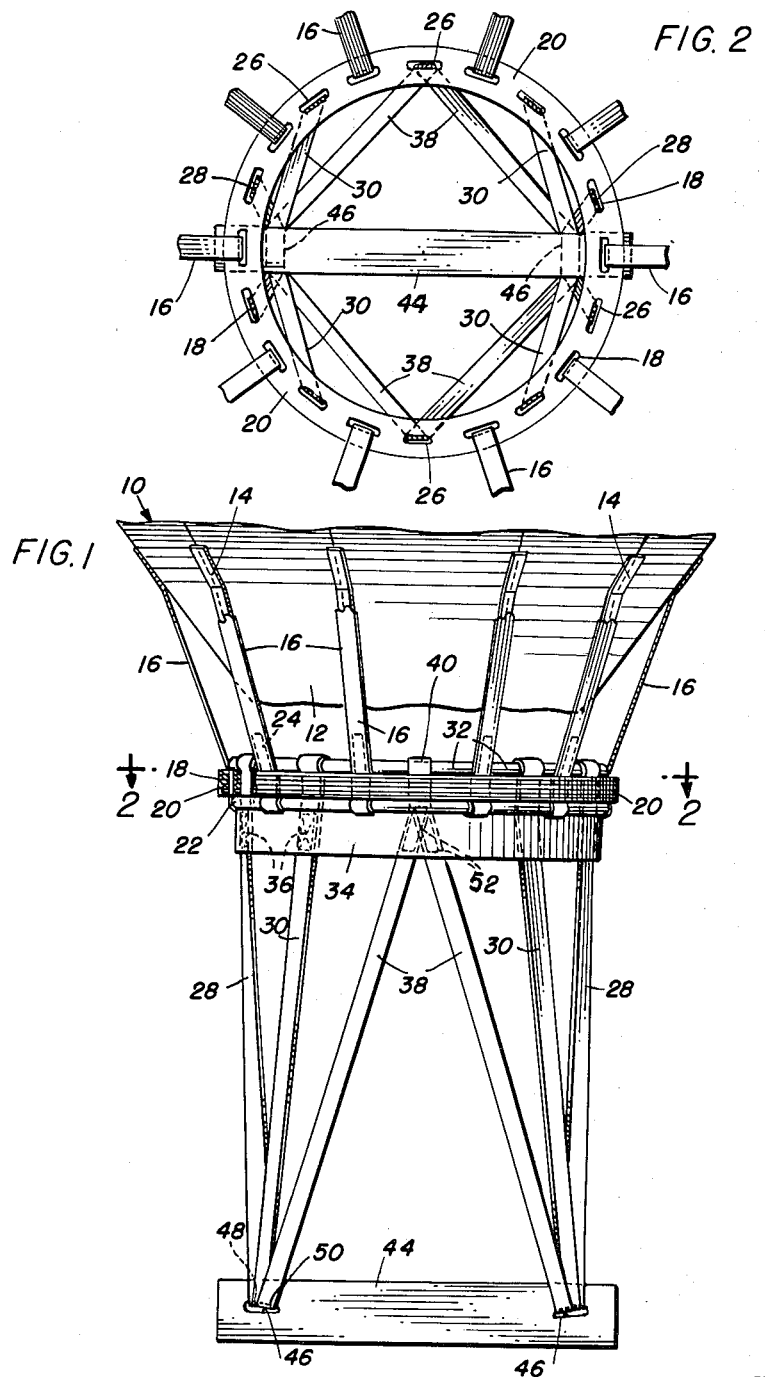
INVENTOR:
ARNOLD E. EBNETER
BY
ATT'YS United States Patent Office 2,728,540
Patented Dec. 27, 1955

2,728,540

BALLOON SUSPENSION SYSTEM

Arnold E. Ebneter, Portage, Wis., assignor, by mesne assignments, to the United States of America as represented by the Secretary of the Navy Application January 29, 1954, Serial No. 407,184

8 Claims. (Cl. 244—127)

This invention relates to high-altitude, load-bearing balloons and more particularly to an improved suspension system for balloon pay loads which provides a simple way of attaching the balloon-rigging lines to the load.

An important object of the invention is to provide a suspension system for supporting a pay load from a balloon by transmission of equal stresses to each of the balloon load lines.

A further object of the invention is to provide an improved means for operating and equalizing the load line stresses and for connecting a load-supporting member by load lines supported from a common member which also has a connection with the balloon load lines.

A still further object of the invention is to provide a load ring in which the balloon load lines are connected about the periphery thereof at spaced distances apart with alternate connections between those of the balloon load lines extending to a load-supporting member.

Other objects of the invention will appear in the specification and will be apparent from the accompanying drawings in which:

Fig. 1 is a side elevation with some details in section of a suspension system for balloon pay loads in accordance with this invention; and Fig. 2 is a plan view taken from directly above the equalizing load ring, as taken on the line 2—2 of Fig. 1.

In prior construction, it has been the practice to connect small rings to the lower end of each of the balloon-rigging lines and then to connect these rings with ropes or other lines which extend either directly to a load-bearing member or to other supporting members to which the pay-load is connected. The present invention overcomes these objections by providing a common supporting ring to which the rigging lines and the load-supporting lines are connected in alternate relations so that the balloon load line pressures are equalized and the load bearing lines, which are connected intermediate the balloon load lines in a circle, may also provide an equalized supporting system for a common bar load member.

Referring now more particularly to the drawings, a balloon 10, only fragmentarily indicated in the drawing, has a plurality of vertically extending gores 12 which are joined at their adjacent edges to form seams connected by tapes 14. These gores may be of a thermoplastic gas-proof sheet material seamed together by the application of heat. Load lines in the form of tapes 16 are commonly attached about the balloon at the seams, and the lower ends of the tapes which form the rigging lines are then attached at spaced intervals through slots 18 in a load-bearing ring 20. This ring may be of wood, preferably laminated, or fabric, light metal, or any other suitable material.

The lower end of each tape 16 is inserted through one of the slots 18, and the tape encircles a spool or a continuous ring 22 disposed closely below the annular load ring 20. This spool or load ring is of a diameter several times larger than the width of each slot 18, and this end of the tape is either in the form of a loop through which the ring 22 is inserted or the end of the tape is rated through the slot 18 and attached by stitching 24 to the other portion of the tape 16.

Intermediate the slots 18 are similar slots 26 through which the upper ends of load-supporting tapes 28 and 30 are inserted, the upper ends of the loops encircling an annular ring 32 in the form of a loop and turned downwardly through the slots 26 below the ring 22 where they are adjacent a fabric band 34 which surrounds the tapes and to which the ends of the tapes 28 and 30 are secured by stitching 36 to seal the closed loops. One or more load-supporting tapes 38 may also be provided which has a loop 40 at its upper end extending around the annular ring 32 and downwardly through one of the slots 26, the emerging portions of the tape below the load ring 20 being connected together and to the fabric band 30 by stitching 42 so that portions of these tapes may diverge from each other.

A load-bearing member 44 of wood and metal or other suitable material is disposed below the annular ring 20 and is of a length substantially equal to the diameter of the ring with a transverse opening 46 at each end of the bar in the form of a slot having an upper flat contact portion 48 at the outer portion of the slot and an inclined contact portion 50 at the inner portion of the upper side of the slot. The intermediate portion of each of the load bar tapes 28 and 30 is passed through the opening 46, and the other end of each tape is similarly secured to the annular ring 32. Likewise, the intermediate portions of the diverging tape 38 are inserted through the openings 46 at both ends of the bar 44 engaging the inclined portions 50 of the openings 46, and the other ends of these tapes are similarly secured to the opposite portion of the annular ring 32. To properly connect the ends of the tapes 38 for equalizing the support of the bar member 44, the ends of the tape 38 may be overlapped and connected by stitching 52 in a well-known manner.

The annular ring 20 is preferably of a size depending upon the size of the balloon and its load-bearing capacity, and the number of equalizing slots 18 and 26 is correspondingly varied depending upon the load to be carried. In the present example, ten slots 18 are provided equally spaced about the periphery of the ring for the balloon-rigging line tapes 16, and a similar number of slots 26 are provided for the load-supporting tapes. With this arrangement, there are two opposite, or nearly diametrical sets of load-supporting tapes 28 and 30 which extend through the slots 46 and are connected through four openings at each opposite side of the ring 20, and there is a single tape 38 having a loop connection 40 at opposite sides of the ring 20 and at right angles to the load-supporting bar 44 and in which the tapes engage the inclined portion 50 of the slots 46 at a proper angle to hold the tapes in relatively flat engagement to prevent them from becoming wrinkled at the connections with the bar.

With this construction, the load-bearing lines above and below the ring 20 are not tied to each other but in each case encircle smooth round members which equalize their stress and prevent undue wearing of the tapes. The tapes are thus easily assembled and connected to the balloon, to the supporting bar 44, and through the annular equalizing ring 20 and the tape-engaging rings 22 and 32. They may also be easily disconnected from such engagement by separate removal of the tapes.

While a preferred embodiment has been described in detail, it should be regarded as an example or embodiment of the invention and not as a restriction or limitation therein as many changes may be made in the construction and arrangement of the parts without departing from the spirit and scope of the invention.

I claim:

1. A balloon suspension system comprising a plurality of supporting-load lines extending inwardly toward each other below a balloon, an annular load ring having slots at spaced distances through which the said lines extend, a load support below the ring having openings at opposite ends thereof, a plurality of supporting lines having looped portions extending through the slots at said opposite ends and through slots in the ring intermediate the slots for receiving the balloon load lines, and means at opposite sides of the ring for engaging the looped portions of the load lines from the balloon and from the supporting member extending through the ring from the opposite sides thereof.

2. In a balloon suspension apparatus in accordance with claim 1, the load ring having flat peripheral slots, the load and supporting lines being flat tapes with end loops extending through alternate slots in the load ring.

3. In a balloon suspension apparatus in accordance with claim 2, the flat tapes having the loops at opposite sides of the ring and circular members at each side of the ring for engaging the loops of the tapes extending through from the opposite sides of the ring for holding the tapes tightly against the ring in supporting a load.

4. A balloon suspension apparatus in accordance with claim 2, in which the load-supporting tapes extending downwardly from the annular load ring are inclined downwardly toward the ends of the supporting bar so that the tapes from both halves of the ring extend through the openings in the respective ends of the bar.

5. A balloon suspension system in accordance with claim 4, in which the depending load-suspending tapes are looped over the supporting means at the upper side of the annular load ring and extend downwardly through the ring and angularly from diametrical slots at right angles to the supporting bar through the openings at the ends of the bar.

6. In a balloon suspension system in accordance with claim 2, the flat tapes extending downwardly below the load ring having a fabric supporting ring to which they are individually secured.

7. In a balloon suspension apparatus in accordance with claim 3, the means at opposite sides of the load ring for engaging the load lines comprising rings larger in diameter than the inner periphery of the load ring to engage the load ring closely adjacent the slots, and the said engaging rings being larger in cross section than the width of the slots in the load ring.

8. A balloon suspension system comprising a plurality of supporting load tapes extending inwardly toward each other below a balloon, an annular load ring below the balloon having a plurality of flat tangential slots at spaced distances through alternate slots of which the said tapes extend, a load-supporting bar below the ring having transverse openings at opposite ends thereof approximately below the opposite sides of the ring, a plurality of supporting tapes extending through the openings at opposite ends and through other alternate slots in the ring, portions of the tapes extending through the slots in the annular ring to form loops at the opposite sides of the ring from which they are inserted and fastening rings at opposite sides of the load ring inserted through the loops of the tapes and drawn against the load ring when a load is applied to the supporting bar for equalizing the pressure of the tapes above and below the load ring.

References Cited in the file of this patent

UNITED STATES PATENTS

| 2,526,719 | Winzen | Oct. 24, 1950 |

FOREIGN PATENTS

| 261 | Great Britain | of 1893 |
| 127,000 | Great Britain | May 29, 1919 |
| 216,614 | Germany | Nov. 26, 1909 |